United States Patent
Schaaf

(10) Patent No.: US 9,610,912 B2
(45) Date of Patent: Apr. 4, 2017

(54) ARRANGEMENT HAVING A TRIM COMPONENT AND A RADAR SENSOR, MOTOR VEHICLE AND METHOD FOR MANUFACTURING AN ARRANGEMENT

(71) Applicant: VALEO Schalter und Sensoren GmbH, Bietigheim-Bissingen (DE)

(72) Inventor: Michael Schaaf, Reichertshofen (DE)

(73) Assignee: VALEO Schalter und Sensoren GmbH, Bietigheim-Bissingen (DE)

( * ) Notice: Subject to any disclaimer, the term of this patent is extended or adjusted under 35 U.S.C. 154(b) by 51 days.

(21) Appl. No.: 14/426,593

(22) PCT Filed: Aug. 14, 2013

(86) PCT No.: PCT/EP2013/066957
§ 371 (c)(1),
(2) Date: Jun. 10, 2015

(87) PCT Pub. No.: WO2014/037194
PCT Pub. Date: Mar. 13, 2014

(65) Prior Publication Data
US 2016/0023624 A1    Jan. 28, 2016

(30) Foreign Application Priority Data
Sep. 7, 2012   (DE) .................. 10 2012 017 669

(51) Int. Cl.
*B60R 19/48*   (2006.01)
*B60R 19/03*   (2006.01)
*G01S 13/93*   (2006.01)

(52) U.S. Cl.
CPC ............ *B60R 19/483* (2013.01); *B60R 19/03* (2013.01); *G01S 13/931* (2013.01);
(Continued)

(58) Field of Classification Search
CPC .......... G01S 13/931; G01S 2013/9375; G01S 2013/9389; B62D 1/28; B62D 1/24;
(Continued)

(56) References Cited

U.S. PATENT DOCUMENTS 3,794,997 A * 2/1974 Iwatsuki ............... B60R 19/483
                                                    180/169
5,438,333 A * 8/1995 Perkins ................ H01Q 17/001
                                                       342/4

(Continued)

FOREIGN PATENT DOCUMENTS

DE          198 30 811 A1    9/1999
DE     10 2009 042 285 A1    3/2011
(Continued)

OTHER PUBLICATIONS

International Search Report issued in PCT/EP2013/066957 mailed on Nov. 21, 2013 (4 pages).
(Continued)

*Primary Examiner* — Glenn Dayoan
*Assistant Examiner* — Sunsurraye Westbrook
(74) *Attorney, Agent, or Firm* — Osha Liang LLP

(57) ABSTRACT

An arrangement for a motor vehicle having a trim component, in particular a bumper, and a radar sensor is disclosed. In order to detect target objects, the radar sensor is designed to emit electromagnetic waves through the trim component and to receive radiation echoes from the target objects. The radar sensor has an azimuthal detection angle, by which a field of vision of the radar sensor in the azimuthal direction is defined, and is arranged at a distance from a rear side of the trim component, with the result that the azimuthal field of vision of the radar sensor intersects the trim component in an intersection region. In order to absorb interference waves outside the azimuthal detection angle an absorptive
(Continued)

material is applied outside the intersection region in the azimuthal direction to the rear side of the trim component, where the intersection region is free of absorptive material.

12 Claims, 3 Drawing Sheets

(52) U.S. Cl.
CPC .............. *G01S 2013/9325* (2013.01); *G01S 2013/9378* (2013.01); *G01S 2013/9389* (2013.01)

(58) Field of Classification Search
CPC ...... B62D 21/00; B62D 21/15; B62D 21/152; B62D 51/002; B62D 65/18; B60K 28/00; B60K 28/14; B60K 28/10
USPC .............. 342/70, 27, 71, 711–713, 909–910, 342/911 R; 293/4, 117, 5, 2, 102, 134, 41, 293/13, 16, 43, 187.04, 187.09, 203.02, 293/55
See application file for complete search history.

(56) References Cited

U.S. PATENT DOCUMENTS

| | | | |
|---|---|---|---|
| 6,496,138 B1 | 12/2002 | Honma | |
| 6,933,881 B2* | 8/2005 | Shinoda | ............... H01Q 1/3233 |
| | | | 342/1 |
| 8,075,029 B2* | 12/2011 | Takahashi | ............. B60R 19/483 |
| | | | 293/121 |
| 2013/0218398 A1* | 8/2013 | Gandhi | ................... B60R 16/02 |
| | | | 701/31.1 |

FOREIGN PATENT DOCUMENTS

| | | |
|---|---|---|
| EP | 1 471 598 A1 | 10/2004 |
| EP | 1 674 882 A1 | 6/2006 |
| WO | 2006/005546 A1 | 1/2006 |

OTHER PUBLICATIONS

German Search Report issued in 10 2012 017 669.4 mailed on Oct. 15, 2012 (5 pages).

* cited by examiner

ARRANGEMENT HAVING A TRIM COMPONENT AND A RADAR SENSOR, MOTOR VEHICLE AND METHOD FOR MANUFACTURING AN ARRANGEMENT

The invention relates to an arrangement for a motor vehicle, comprising a trim component, in particular a bumper, and a radar sensor, which, in order to detect target objects, is designed to emit electromagnetic waves through the trim component and to receive the waves (radiation echoes) reflected from the target objects. The radar sensor has an azimuthal detection angle, by which a field of vision of the radar sensor in the azimuthal direction is defined. The radar sensor is arranged at a distance from a rear side of the trim component, with the result that the azimuthal field of vision of the radar sensor intersects the trim component in an intersection region. The invention also relates to a motor vehicle having such an arrangement and to a method for manufacturing such an arrangement.

Radar sensors for motor vehicles are already prior art. The emphasis here is preferably on a radar sensor which is operated at a frequency of approx. 24 GHz. However, the invention is not restricted to such an operating frequency. Radar sensors are generally used to detect target objects and to assist the driver in driving the motor vehicle in a variety of ways. Radar sensors measure the distance between the target object and the vehicle. They measure both the relative velocity with respect to the target object, and also the target angle, i.e. the angle between a virtual connecting line to the target object and a reference line, for example the longitudinal axis of the vehicle.

Radar sensors are usually located behind the bumper, for example in the respective corner regions of the bumper. In order to detect the target object, the radar sensor emits electromagnetic waves which are then reflected at the target object to be detected and are received as radar echoes. The propagation of the waves occurs here through the material of the bumper. The received echoes are then evaluated with respect to the measurement variables mentioned above.

A relatively wide azimuthal angular range, which may even be 150°, is usually scanned in the horizontal direction with a radar sensor. The radar sensor therefore has a relatively large azimuthal detection angle, with the result that the field of vision or the detection range of the radar sensor in the azimuthal direction is correspondingly wide. The azimuthal detection angle is as a rule symmetrical with respect to a radar axis which runs perpendicularly with respect to the front sensor surface, with the result that the azimuthal detection angle of for example −75° to +75° is dimensioned with respect to the radar axis.

The azimuthal detection range can be divided into relatively small component regions which are illuminated one after the other by the radar sensor. For this purpose, for example the main lobe of the transmission antenna can be pivoted electronically in the azimuthal direction, for example according to the phase array principle. The reception antenna can in this case have in the azimuthal direction a reception characteristic with which the entire azimuthal detection range is covered. Other refinements can alternatively implement narrow reception angular ranges in conjunction with wide transmission lobes.

In order to be able to measure the target angle mentioned above, an arrangement composed of at least two antennas is used, which antennas can each be formed by individual antenna elements or else by antenna arrays. The waves reflected at the target object are received by the two reception antennas at different times, with the result that the reception signal of the first antenna has a phase shift with respect to the reception signal of the second antenna. The target angle can be determined as a function of this phase difference between the phase of the first reception signal and the phase of the second reception signal. For this purpose, a phase characteristic or a phase curve is used which defines the dependence of the target angle on the phase difference. Such an exemplary phase curve is illustrated in FIG. 1. In this context, the target angle α is plotted on the x axis while the phase difference Ph is plotted on the y axis. The phase characteristic illustrated in FIG. 1 represents a phase curve which is obtained in the case of a non-installed radar sensor whose housing is screened on a standard basis against interference radiation from the rear.

If the radar sensor is then installed in a motor vehicle, the bumper also additionally influences the propagation of the electromagnetic waves, to be precise both the emitted waves and also the waves which are reflected at the target object and which are incident on the radar sensor. Furthermore, in the case of an installed radar sensor it is problematic that transmitted and received electromagnetic waves are reflected at metallic and dielectric objects. In this context, in particular structures in the region behind the radar sensor and therefore in the region of the bogie are problematic. As a result of reflections at metallic structures of the motor vehicle, the radar sensor experiences interference and the measured values can be falsified. In the case of an installed radar sensor, a quite different picture from that according to FIG. 1 is obtained for the phase characteristic. This phase curve which is obtained for an installed sensor is illustrated by way of example in FIG. 2. Ripples are formed on the phase curve which are, on the one hand, in the azimuthal angular range from −75° to −35° and, on the other hand, also in the angular range from +35° to +75°. The waves on the phase curve which are illustrated in FIG. 2 occur, in particular, owing to the interference radiation from the rear or owing to interference waves which are reflected at vehicle components and pass as secondary radiation from outside the azimuthal detection angle into the reception region of the radar sensor. A large part of this scattered interference radiation results from what are referred to as multiple reflections of the echoes which come from the bumper region and from the boot region of the vehicle and therefore pass from the space to the rear of the radar sensor back into the highly sensitive region of the reception antenna arrangement. As a result interference occurs with the original echoes which pass on a direct path from the target objects into the reception antennas. Another portion of the interference waves results from induction effects within the reception antenna arrangement.

The interference radiation from the rear is remedied here by an absorptive screen which was specially developed for the purpose of absorbing the secondary radiation. Such an independent absorptive screen can be embodied as an element which is separate from the sensor housing and which is arranged around the raydome of the radar sensor and surrounds or engages around the outer circumference of the raydome. Such a plate-shaped absorptive screen which extends laterally outwards from the radar sensor then terminates flush with the front side of the raydome. Although such an absorptive screen absorbs the interference waves and therefore prevents propagation of the interference waves into the reception region of the radar sensor, such an independent and inherently rigid component also has certain disadvantages: on the one hand, an absorptive screen requires a relatively large amount of installation space which is usually not available behind the bumper. On the other hand, such a component is expensive compared to the radar sensor. Because of the mirror symmetry of the bumpers, the absorptive screen must be configured differently for the left-hand and the right-hand radar sensors, which in turn gives rise to increased expenditure in terms of fabrication equipment and logistics. Last but not least, the absorptive screen contributes to the overall weight of the installation configuration.

The object of the invention is to indicate a solution with which the influence of interference waves on the method of functioning of the radar sensor in an arrangement of generic type mentioned at the beginning can be reduced compared to the prior art without a large amount of expenditure.

This object is achieved according to the invention by means of an arrangement, by means of a motor vehicle as well as by means of a method having the features according to the respective independent patent claims. Advantageous embodiments of the invention are the subject-matter of the dependent patent claims of the description and of the figures.

An arrangement according to the invention for a motor vehicle comprises a trim component, in particular a bumper, and a radar sensor, which, in order to detect target objects, is designed to emit electromagnetic waves through the trim component and to receive radiation echoes from the target objects. The radar sensor has an azimuthal detection angle, by which a field of vision of the radar sensor in the azimuthal direction is defined, wherein the radar sensor is arranged at a distance from a rear side of the trim component, with the result that the azimuthal field of vision of the radar sensor intersects the trim component in an intersection region. In order to absorb interference waves outside the azimuthal detection angle an absorptive material is applied outside the intersection region in the azimuthal direction to the rear side of the trim component, and the intersection region is free of absorptive material.

The invention therefore adopts the strategy of providing the rear side of the trim component with an absorptive material, specifically outside the azimuthal field of vision of the radar sensor. By dispensing with an independent and inherently rigid absorptive screen, as is used around the sensor housing in the prior art, the interference radiation from the rear can therefore be reliably and effectively absorbed without installation space behind the trim component being taken up or else the overall weight of the arrangement being also additionally increased. The above-mentioned absorptive screen can be replaced by a corresponding layer on the rear side of the trim component by providing the rear side of the trim component with the absorptive material or with an absorption layer which brings about total absorption of the interference waves, for example in the region of 24 GHz. The invention has various advantages: as already stated, it is possible to dispense with the separate absorptive screen on the sensor housing. This leads to a situation in which overall less installation space is required for the radar sensor or the holder and the plug behind the trim component. The additional weight of the absorptive screen is eliminated. Last but not least, by dispensing with the separate absorptive screen costs can also be saved. Nevertheless, the interference waves or the secondary radiation incident from the region to the rear of the radar sensor can be effectively absorbed by the corresponding absorption layer at the rear side of the trim component, with the result that reliable operation of the radar sensor is ensured overall.

An "absorptive material" is understood to be a material which completely or almost completely absorbs the electromagnetic waves in the region of the operating frequency of the radar sensor. The absorptive material is also known by the term "radar absorptive material" (RAM). Such materials are already known from the prior art. The absorptive material which is used can be, for example, a wave-absorbing plastic. It is possible, for example, to use a black plastic granulate such as is already used for manufacturing the absorptive screen mentioned above. This plastic granulate can then be comminuted and processed or converted into powder. Such a powder can be mixed with a two-component epoxy resin and stirred and subsequently applied with a corresponding thickness to the rear side of the bumper. This application can look as if the rear side of the trim component has been painted or sprayed with the absorptive material. Such a "surface coating process" can be carried out, for example, with a template.

In contrast to the subject-matter according to document U.S. Pat. No. 6,496,138 B1—in this document the absorptive material influences the propagation of the emitted waves and therefore the directional characteristic of the radar sensor—in the arrangement according to the invention it is proposed that in order to absorb interference waves outside the azimuthal detection angle and therefore to absorb the secondary radiation the absorptive material should be applied outside the intersection region of the azimuthal field of vision of the radar sensor with the trim component, to the rear side of said trim component. The propagation of the emitted radar waves is therefore not influenced by the absorptive material.

In one embodiment there is provision that the absorptive material directly adjoins an edge of the intersection region in the azimuthal direction and therefore the intersection region. The absorptive material is therefore arranged in the azimuthal direction directly next to the intersection region of the field of vision of the radar sensor with the trim component. This makes it possible to absorb the interference radiation from the rear particularly effectively without these interference waves entering the field of vision of the radar sensor.

The absorptive material is preferably applied to both sides of the intersection region in the azimuthal direction to the rear side of the trim component. Interference waves on both sides of the radar sensor can therefore be absorbed.

In addition to the field of vision in the azimuthal direction, the radar sensor preferably also has widening of the radiation in the elevation direction. This may be, for example, from −15° to +15° with respect to the horizontal. The elevation angle defines a field of vision of the radar sensor in the elevation direction, which field of vision bounds the intersection region in the elevation direction. In this embodiment, an absorptive material can also be applied outside the intersection region in the elevation direction to the rear side of the trim component, in order to suppress the scattered radiation in the elevation direction. The field of vision of the radar sensor is therefore protected from the interference waves not only in the azimuthal direction but also in the elevation direction. There is also provision here in particular that in the elevation direction the absorptive material is applied to both sides of the intersection region (both underneath and above), to the rear side of the trim component.

Overall, the absorptive material can form a surface which is enclosed around the intersection region. This means that the rear side of the trim component around the radar sensor, and therefore around the circumference, is provided with the absorptive material, while a "radiation window" which is free of the absorptive material and whose size corresponds to the size of the intersection region of the entire field of vision of the radar sensor with the trim component is formed in front of the radar sensor. Therefore, on the one hand good transmission of the emitted waves through the trim component is ensured, and on the other hand the interference waves from the rear can therefore be reliably absorbed around the radar sensor and the field of vision of the radar sensor can therefore be protected from the interference waves.

Consequently, depending on the geometry of the trim component and on the distance between the radar sensor and the rear side of the trim component a contour of the intersection region is formed within which the radar waves are emitted and received through the trim component. The surface which is formed by this contour is free of the absorptive material or the absorptive material is located outside this contour and is preferably directly adjacent. This contour of the entire intersection region can be calculated individually for different vehicle configurations using, for example, a CAD program.

The extent or the width of the absorptive material in the azimuthal direction starting from the intersection region is preferably greater than 2 cm, in particular greater than 3 cm and more preferably greater than 5 cm. This extent can be the same on the left- and right-hand sides of the sensor housing. Such a width of the absorptive material in the azimuthal direction results in sufficient absorption of the interference waves.

Starting from the intersection region, the extent of the absorptive material in the elevation direction can be less than the extent in the azimuthal direction. The extent in the elevation direction can be, for example, 1 cm or 2 cm or 3 cm or 4 cm.

As already stated, the sensor housing is arranged with its raydome at a distance from the rear side of the trim component. It has proven advantageous if this distance between the raydome and the rear side of the trim component is greater than $\lambda/2$, wherein $\lambda$ denotes the wavelength of the electromagnetic waves. It has been found that such a distance of at least $\lambda/2$—that is to say for example of at least 0.5 cm to 0.8 cm—ensures that the dielectric material of the trim component does not disrupt the generation of a collimated electromagnetic wave. This arises from the fact that directly at the transmission antenna the electric field vector is equal to zero, and in the near field of 1 to 2 wavelengths the field energy of the electromagnetic wave is mainly contained in the magnetic field (H-field). The field energy is distributed uniformly to the electric field (E-field) and the H-field only in the far field of 5 to 10 wavelengths. If the minimum distance specified above is undershot the dielectric material of the trim component disrupts the generation of the E-field and therefore of a collimated wave.

As a result of the arrangement of the radar sensor at a distance from the rear side of the trim component, an air gap is formed between the raydome, on the one hand, and the trim component, on the other. This air gap is, in particular, free of any elements and absorptive materials which could disrupt the propagation of the electromagnetic waves.

The azimuthal detection angle of the radar sensor is preferably in a value range from 140° to 170° and is preferably 150°. However, the invention is not restricted to such a radar sensor with such a wide azimuthal detection angle.

If the sensor housing is arranged at a distance from the rear side of the trim component and if the absorptive material is located outside the intersection region of the field of vision of the radar sensor with the trim component, the raydome of the radar sensor is also at a distance from the absorptive material and therefore an air gap is also formed between the absorptive material on the one hand and the edge region of the raydome on the other. In order to bridge this distance and to reduce the penetration of scattering interference waves into the field of vision of the radar sensor to a minimum, the arrangement can also have an absorptive element for absorbing the interference waves, which absorptive element bears, on the one hand, on an edge region of the raydome and/or on a side wall of the radar housing and, on the other hand, on the absorptive material.

The absorptive element can be in the form of a circumferential sleeve: it is preferably embodied as a circumferential, preferably funnel-shaped collar—in particular in the form of a ruff or the like—whose first end engages around or encloses the raydome on the outer circumference and whose second end bears on the absorptive material, and therefore preferably surrounds the outer circumference of the intersection region of the field of vision of the radar sensor with the trim component. As a result of such a configuration of the absorptive element, on the one hand the entire field of vision of the radar sensor is protected against secondary radiation which penetrates in an extremely flat or quasi parallel fashion with respect to the trim component and which originates from the region behind the radar sensor, is reflected at the trim component and is passed on from there in a scattering fashion to the front surface of the raydome. On the other hand, such an absorptive element additionally also has the advantage that vibrations of the sensor housing in the region of the motor vehicle—for example in the frequency range from 50 to 200 Hz—can be damped. The absorptive element therefore assumes overall two different functions, specifically, on the one hand, the function of absorbing the electromagnetic secondary radiation and, on the other hand, the function of damping vibrations which act on the sensor housing.

The absorptive element can, for example, be bonded or welded to the housing of the radar sensor—in the edge region of the raydome. Bonding or else welding on the sides of the trim component or of the absorptive material is also possible.

The absorptive element is preferably formed from an elastic material, specifically in particular from foamed material. This material can be coated on the outer surface with an absorptive material (RAM), that is to say with the same absorptive material which is applied to the rear side of the trim component. The configuration of the absorptive element from an elastic material makes it possible to arrange the radar sensor behind the trim component in such a way that it applies a light pressure against the absorptive element. The vibrations of the sensor housing are therefore significantly reduced by the damping effect of the elastic material.

The absorptive element therefore preferably constitutes a circumferential elastic and, in particular, also thin, seal which is arranged around the circumference of the raydome of the sensor housing and interacts in a seal-forming fashion with the rear side of the trim component, on the one hand, and with the edge region of the raydome, on the other.

For example a continuous wave radar, which is designed to emit a continuous electromagnetic wave with a modulated frequency (also known under the designation FMCW radar or "frequency modulated continuous wave radar"), can be used as the radar sensor. With such a radar sensor it is possible to determine the distance of the target object and the relative speed of the target object with respect to the motor vehicle and the target angle. A receiver of the radar sensor can have at least two reception paths which can each comprise a down mixer, an amplifier and an analogue/digital converter. However, the invention is not restricted to such a radar sensor.

In the radar sensor it is also possible to use a separate transmission antenna—either a single transmission antenna or a transmission antenna group—which is fed using a local oscillator to generate a transmission signal. The transmission antenna can be phase-controlled electronically in order to be able to cover overall a relatively wide detection angle in the azimuthal direction with a relatively narrow main lobe of the directional characteristic in the azimuthal direction.

Different applications of the radar sensor in the motor vehicle are appropriately possible: for example the radar sensor can be used for a lane change assistant, for monitoring the blind spot and also for early detection of accidents. The arrangement according to the invention can, however, also have the function of an automatic distance warning system, a distance regulating system, a lane exit warning system and/or a parking aid. The radar sensor can also be a component of a blind spot detection system (blind spot warning) and/or a lane change assistant (lane change assist) and/or an aid for rearward exiting from a parking space (cross traffic alert) and/or a door opener assistant (door opening assist) and/or a rear-end collision detection system (rear pre-crash).

The invention also relates to a motor vehicle having an arrangement according to the invention.

A method according to the invention is used to manufacture an arrangement for a motor vehicle by making available a trim component, in particular a bumper, and making available a radar sensor, which, in order to detect a target object, emits electromagnetic waves through the trim component and receives the waves reflected at the target object as radiation echoes, wherein the radar sensor has an azimuthal detection angle, by which a field of vision of the radar sensor in the azimuthal direction is defined, and wherein the radar sensor is arranged at a distance from a rear side of the trim component, with the result that the azimuthal field of vision of the radar sensor intersects the trim component in an intersection region. In order to absorb interference waves outside the azimuthal detection angle an absorptive material is applied outside the intersection region in the azimuthal direction to the rear side of the trim component, and the intersection region is embodied so as to be free of absorptive material.

The preferred embodiments which are presented with respect to the arrangement according to the invention, and the advantages thereof, apply correspondingly to the motor vehicle according to the invention and to the method according to the invention.

Further features of the invention can be found in the claims, the figures and the description of the figures. All the features and feature combinations specified above in the description and the features and feature combinations which are specified below in the description of the figures and/or solely in the figures can be used not only in the respectively specified combination but also in other combinations or else alone.

The invention will now be explained in more detail with reference to a preferred exemplary embodiment as well as with reference to the appended drawings. It is emphasized that the exemplary embodiment described below constitutes a preferred embodiment of the invention and the invention is therefore not restricted to the exemplary embodiment.

In the drawings.

In the figures, identical or functionally identical elements are provided with the same reference symbols.

Figure 3:
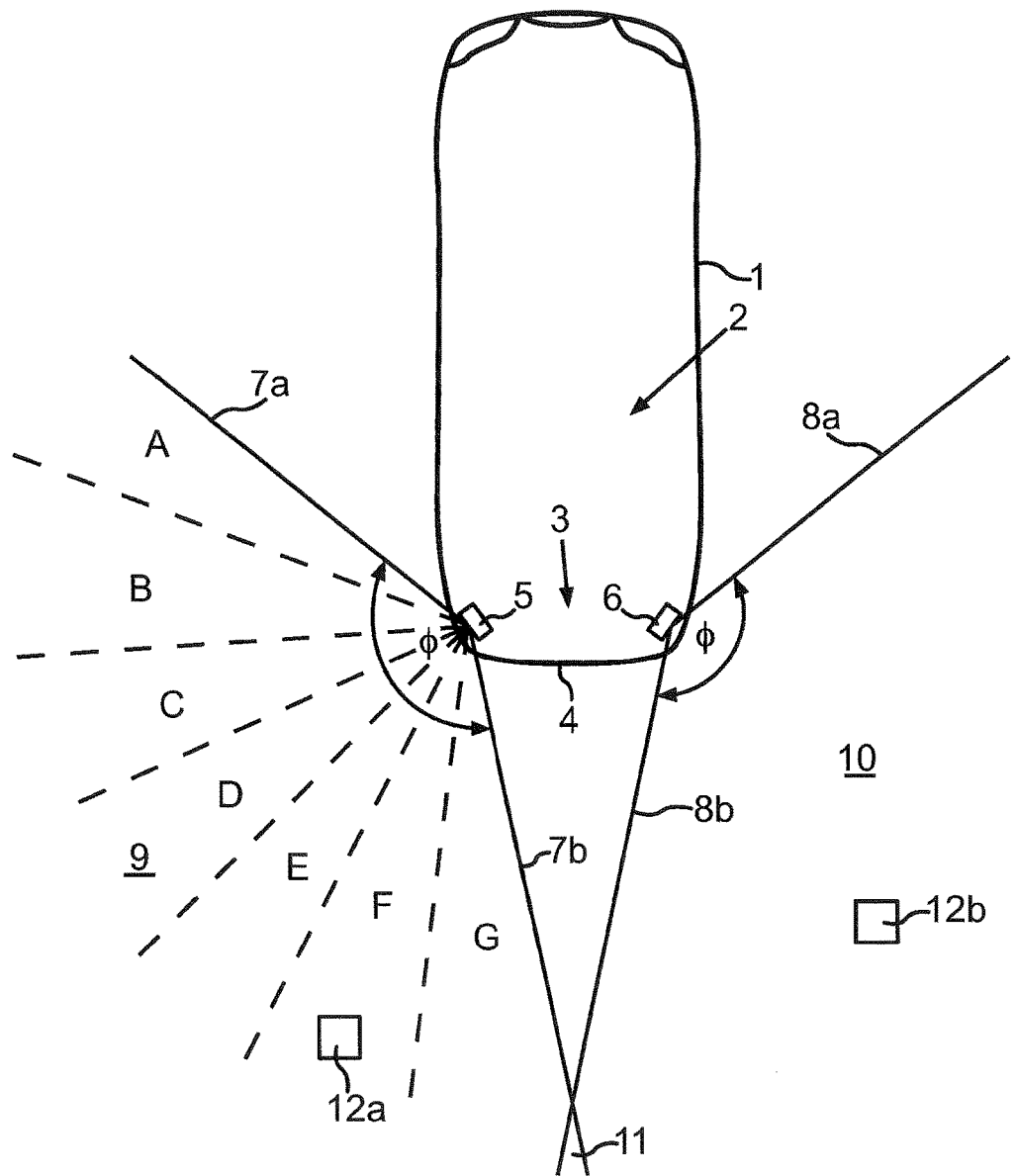
FIG. 3 is a schematic illustration of a motor vehicle having an arrangement according to an embodiment of the invention.

A motor vehicle 1 which is illustrated in FIG. 3 is, for example, a passenger car. The motor vehicle 1 comprises a driver assistant system 2 which assists the driver in driving the motor vehicle 1.

The driver assistant system 2 includes an arrangement 3 composed of a rear bumper 4 of the motor vehicle 1 and two radar sensors, specifically a first radar sensor 5 and a second radar sensor 6. The bumper 4 is a trim component of the motor vehicle 1.

The first radar sensor 5 is arranged in a left-hand rear corner region of the motor vehicle 1, while the second radar sensor 6 is arranged in a right-hand rear corner region. Both radar sensors 5, 6 are located behind the bumper 4 and therefore not visible from outside the motor vehicle 1. The radar sensors 5, 6 are in other words arranged hidden or concealed behind the bumper 4.

The radar sensors 5, 6 are, for example, frequency modulated continuous wave radar sensors (frequency modulated continuous wave radar).

The radar sensors 5, 6 each have an azimuthal detection angle $\phi$, which is bounded in FIG. 3 by two lines 7a, 7b (for the left-hand radar sensor 5) and 8a, 8b (for the right-hand radar sensor 6). The azimuthal detection angle $\phi$ is, for example, 150°. The azimuthal detection angle $\phi$ defines in each case a field of vision 9 or 10 of the respective radar sensor 5, 6 in the azimuthal direction and therefore in the horizontal direction. The fields of vision 9, 10 can overlap one another with the result that an overlapping region 11 is formed.

Figure 1:
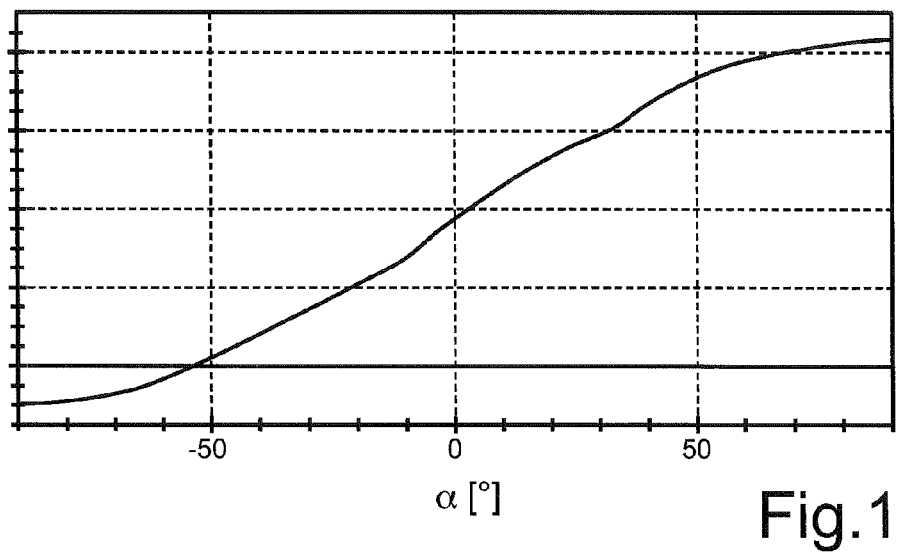
FIG. 1 shows a phase characteristic of a radar sensor in the non-installed state.
Figure 2:
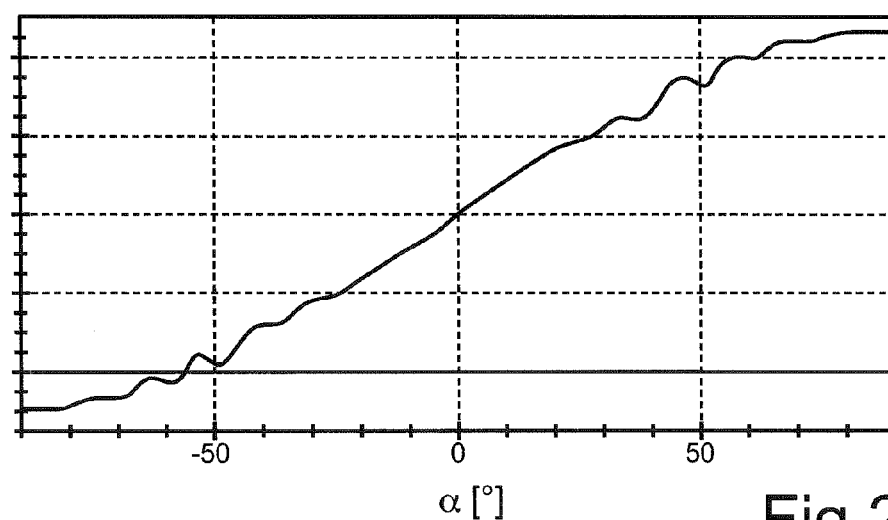
FIG. 2 shows a phase characteristic of the radar sensor in the installed state.

In their respective fields of vision 9, 10, the radar sensors 5, 6 can detect (vehicle-external) target objects 12a (on the left) and 12b (on the right). In particular, the radar sensors 5, 6 can determine the distance of the target objects 12a and 12b from the respective radar sensor 5, 6 as well as in each case determine the target angle and the relative speed of the target objects 12a and 12b with respect to the motor vehicle 1—these are measurement variables of the radar sensors 5, 6. The target angle is determined by means of a phase curve, as illustrated, for example in FIG. 1.

Also with respect to FIG. 3, the radar sensor 5—and analogously also the radar sensor 6—can irradiate various component regions A, B, C, D, E, F, G of the azimuthal field of vision 9 in succession. These component regions A to G constitute angular ranges, wherein in order to detect the component regions A to G in succession a transmission lobe of a transmission antenna of the radar sensor 5 is, for example, pivoted electronically in the azimuthal direction, specifically according to the phase array principle. The two specified reception antennas can in this case have in the azimuthal direction a wide reception characteristic with which the entire azimuthal field of vision $\phi$ is covered. Other refinements can alternatively implement narrow reception angular ranges in conjunction with wide transmission lobes.

In FIG. 3, for the sake of clarity only the component regions A to G of the field of vision 9 of the first radar sensor 5 are illustrated. However, the horizontal field of vision 10 of the second radar sensor 6 is correspondingly also divided into a plurality of component regions here. Even if the further description relates to the first radar sensor 5, the method of functioning and arrangement correspond to the second radar sensor 6.

The number of component regions A to G is illustrated merely by way of example in FIG. 3 and can be different depending on the embodiment. In the exemplary embodiment, a total of seven component regions A to G are provided, which component regions A to G are illuminated one after the other by the radar sensor 5.

Figure 4:
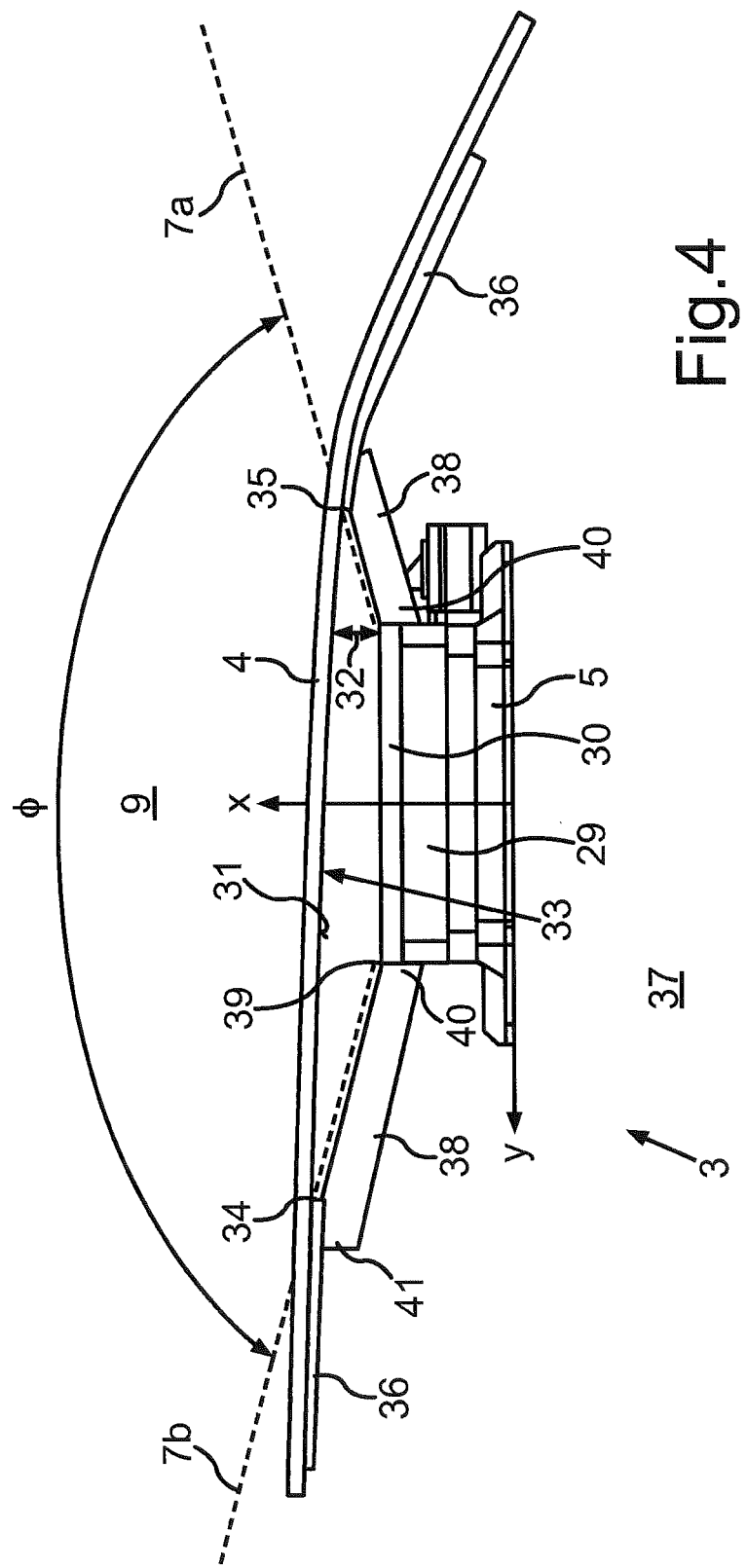
FIG. 4 is a schematic illustration of a sectional view through an arrangement according to an embodiment of the invention.

FIG. 4 now shows in a schematic illustration a sectional view through an arrangement 3 from the radar sensor 5 and the bumper 4 along a horizontal plane. The azimuthal detection angle φ is bounded by the lines 7a, 7b. The radar sensor 5 has a housing 29 in which all the components of the radar sensor 5 are accommodated. At the front, and therefore on the front side facing the bumper 4, the housing 29 is covered with a raydome 30 which constitutes a protective element for the transmission and reception antennas of the radar sensor 5. The electromagnetic waves are emitted and received through the raydome 30. The raydome 30 here faces a rear side 31 of the bumper 4, which rear side 31 faces the passenger compartment of the motor vehicle. The raydome 30 is located at a distance 32 from the rear side 31, wherein 32 denotes the minimum distance between the radar sensor 5 and the bumper 4.

A local coordinate system x, y is defined in the radar sensor 5. The radar axis x runs perpendicularly with respect to the front surface of the raydome 30, while the y axis runs parallel with respect to the raydome 30 and therefore perpendicularly with respect to the radar axis x. The vertical direction of the radar sensor 5 is not illustrated in FIG. 4.

An angle between the axis y and the vehicle longitudinal axis denotes an installation angle of the radar sensor 5 in the azimuthal direction. This installation angle can be, for example, in a value range from 30° to 45°. This installation angle can be 37° in one embodiment.

As already stated, the azimuthal detection angle φ of the radar sensor 5 is, for example, 150°. In contrast, the detection angle in the elevation direction can be, for example, 30° in total.

The azimuthal field of vision 9 or the azimuthal detection angle φ of the radar sensor 5 intersects the bumper 4 and therefore the rear side 31 in an intersection region 33 which constitutes an ellipse-like surface region on the rear side 31 of the bumper 4. In the azimuthal direction, the intersection region 33 is bounded, on the one hand, by an intersection point 34 of the line 7b with the rear side 31 and, on the other hand, by an intersection point 35 of the line 7a with the rear side 33 of the bumper 4. In the elevation direction, this intersection region 33 is bounded by the elevation angle of the radar sensor 5.

The intersection region 33 is therefore that surface region of the bumper 4 through which the electromagnetic waves are emitted and received and which is irradiated by the entire field of vision of the radar sensor 5. Outside the intersection region 33, an absorptive material 36 is applied around the intersection region 33 on the rear side 31 of the bumper 4 in order to absorb the interference waves which are incident from a region 37 to the rear, behind the radar sensor 5. The absorptive material 36 forms a surface which is enclosed around the intersection region 33 and extends outwards from the intersection region 33 both in the azimuthal direction and in the elevation direction on each of the two sides of the radar sensor 5. In the azimuthal direction, the extent or the width of the absorptive material 36 is several centimeters on each of the two sides.

The intersection region 33 of the bumper 4 with the field of vision 9 alone is free of the specified absorptive material 36, with the result that the electromagnetic waves can propagate undisrupted through the material of the bumper 4.

The absorptive material 36 is a RAM material (radar absorption material). In this context, a plastic granulate can be used as the RAM material, which plastic granulate is then ground and processed into powder. This powder can be stirred with a two-component epoxy resin and applied with a thickness of, for example, $\lambda/2$ to the rear side 31 of the bumper 4.

The specified granulate can also be dissolved in a liquid in order to be able to use it for a spraying process.

The absorptive material 36 is applied uniformly and homogeneously to the rear side 31 of the bumper 4. The absorptive material 36 is then outside the azimuthal detection angle φ and outside the elevation angle of the radar sensor 5 and consequently outside the entire field of vision of the radar sensor 5. In this context, the absorptive material 36 directly adjoins the intersection region 33, with the result that the distance between the absorptive material 36 and the lines 7a and 7b is equal to zero.

The absorptive material 36 reliably protects the field of vision 9 of the radar sensor 5 from interference radiation or secondary radiation from the rear. In order additionally also to be able to protect the reception antennas against secondary radiation which penetrates in a very flat fashion and which originates from the region 37 to the rear, is reflected against the bumper 4 and is passed on from there in a scattering fashion to the front surface of the raydome, an absorptive element 38 in the form of a RAM radiation sleeve is used, which absorptive element 38 is constructed from a flexible plastic material. The absorptive element 38 is coated with a radiation-absorbing material. It is embodied in the form of a circumferential sleeve or a circumferential, funnel-shaped collar, which bears, at one end, on an edge region 39 of the raydome 30 and, at the other end, on the absorptive material 36—in the edge region of the intersection region 33 but outside the intersection region 33. A first end 40 of the absorptive element 38 engages or surrounds the raydome 30 on the outer circumference and is connected to the side wall of the housing 29, for example bonded or welded. Such a bonded connection or else welded connection can also be made available on the side of the absorptive material 36. The absorptive element 38 therefore bears with its second end 41 on the absorptive material 36. The absorptive element 38 therefore constitutes, as it were, a circumferential seal by means of which the field of vision of the radar sensor 5 is completely screened against the interference radiation from the rear.

The absorptive element 38 also has the function of damping vibrations of the radar sensor 5. In order to assist this damping, the radars sensor 5 can be mounted—for example on a chassis of the motor vehicle 1—in such a way that it exerts a slight pressure against the absorptive element 38 and the absorptive element 38 is therefore clamped in between the radar sensor 5, on the one hand, and the absorptive material 36, on the other, under spring force. Therefore, the absorptive element 38 terminates with the rear side 31 of the bumper 4 in a vibration-proof and operationally reliable fashion.

The invention claimed is:
1. An arrangement for a motor vehicle comprising:
a trim component comprising a bumper; and a radar sensor, which, in order to detect target objects, is designed to emit electromagnetic waves through the trim component and to receive radiation echoes from the target objects, wherein the radar sensor has an azimuthal detection angle, by which a field of vision of the radar sensor in the azimuthal direction is defined, and wherein the radar sensor is arranged at a distance from a rear side of the trim component, with the result that the azimuthal field of vision of the radar sensor intersects the trim component in an intersection region, wherein, in order to absorb interference waves outside the azimuthal detection angle, an absorptive material is applied outside the intersection region in the azimuthal direction to the rear side of the trim component, and the intersection region is free of absorptive material, and wherein the arrangement further comprises an absorptive element for absorbing the interference waves, wherein the absorptive element bears on an edge region of a raydome of the radar sensor and on the absorptive material.

2. The arrangement according to claim 1, wherein the absorptive material directly adjoins an edge of the intersection region in the azimuthal direction.

3. The arrangement according to claim 1, wherein in the azimuthal direction the absorptive material is applied to both sides of the intersection region, to the rear side of the trim component.

4. The arrangement according to claim 1, wherein the radar sensor also has a predetermined detection angle in the elevation direction, by which detection angle a field of vision of the radar sensor in the elevation direction is defined, which field of vision bounds the intersection region in the elevation direction, wherein the absorptive material is also applied outside the intersection region in the elevation direction to the rear side of the trim component.

5. The arrangement according to claim 1, wherein the absorptive material forms a surface which is enclosed around the intersection region.

6. The arrangement according to claim 1, wherein an extent of the absorptive material in the azimuthal direction starting from the intersection region is greater than 5 cm.

7. The arrangement according to claim 1, wherein the distance between the radar sensor and the rear side of the trim component is greater than $\lambda/2$, wherein $\lambda$ denotes a wavelength of the electromagnetic waves.

8. The arrangement according to claim 1, wherein the azimuthal detection angle is in a value range from 140° to 170°.

9. The arrangement according to claim 1, wherein the absorptive element is embodied as a circumferential collar whose first end engages around the raydome on the outer circumference and whose second end bears on the absorptive material.

10. The arrangement according to claim 1, wherein the absorptive element is formed from an elastic material, in particular from foamed material.

11. A motor vehicle having an arrangement according to claim 1.

12. A method for manufacturing an arrangement for a motor vehicle, comprising:

making available a trim component comprising a bumper; and making available a radar sensor, which, in order to detect target objects, emits electromagnetic waves through the trim component and receives radiation echoes from the target objects, wherein the radar sensor has an azimuthal detection angle, by which a field of vision of the radar sensor in the azimuthal direction is defined, and wherein the radar sensor is arranged at a distance from a rear side of the trim component, with the result that the azimuthal field of vision of the radar sensor intersects the trim component in an intersection region, wherein in order to absorb interference waves outside the azimuthal detection angle an absorptive material is applied outside the intersection region in the azimuthal direction to the rear side of the trim component, and the intersection region is embodied to be free of absorptive material, and wherein the arrangement comprises an absorptive element for absorbing the interference waves, wherein the absorptive element bears on an edge region of a raydome of the radar sensor and on the absorptive material.

* * * * *